United States Patent
Liao (10) Patent No.: US 6,185,208 B1
(45) Date of Patent: Feb. 6, 2001

(54) METHOD AND APPARATUS FOR FRAGMENTING MESSAGES FOR A WIRELESS NETWORK USING GROUP SHARING OF REFERENCE NUMBERS

(75) Inventor: Hanqing Liao, Danville, CA (US)

(73) Assignee: Phone.com, Inc., Redwood City, CA (US)

( * ) Notice: Under 35 U.S.C. 154(b), the term of this patent shall be extended for 0 days.

(21) Appl. No.: 09/105,691

(22) Filed: Jun. 26, 1998

Related U.S. Application Data (63) Continuation-in-part of application No. 09/071,379, filed on Apr. 30, 1998.

(51) Int. Cl.$^7$ .................................................. H04J 3/26
(52) U.S. Cl. ........................................ 370/392; 370/471
(58) Field of Search .................................. 370/392, 471, 370/473, 474; 707/501; 455/426; 709/203

(56) References Cited

U.S. PATENT DOCUMENTS

| | | | |
|---|---|---|---|
| 5,572,528 | * | 11/1996 | Shuen ................................ 370/85.13 |
| 5,587,997 | * | 12/1996 | Jacobson ............................ 370/253 |
| 5,708,659 | * | 1/1998 | Rostoker et al. ................... 370/392 |
| 5,841,764 | * | 11/1998 | Roderique et al. ................. 370/310 |
| 5,864,554 | * | 1/1999 | Rostoker et al. ................... 370/395 |
| 5,867,652 | * | 2/1999 | Hurvig ........................... 395/200.33 |
| 5,937,169 | * | 8/1999 | Connery et al. ................ 395/200.8 |
| 5,940,390 | * | 8/1999 | Berl et al. ............................ 370/389 |
| 5,991,302 | * | 11/1999 | Berl et al. ............................ 370/400 |

OTHER PUBLICATIONS

Benahm, David, ATM in Local Area Networks: A Tutorial, Hughes LAN Systems, Inc., pp. 33–40, Apr. 1994.*

Corner, Douglas E., Internetworking With TCP/IP vol. I: Principles, Protocols, and Architecture, second edition, Prentice Hall, pp. 92–97, 178–184, 283–284, Dec. 1991.*

Stallings, William, Networking Standards: A Guide to OSI, ISDN, LAN, and MAN Standards, Addison–Wesley Publishing Co., Inc., pp. 34–35, 49–52, 64–67, 119–122, 293–300, 307, Dec. 1993.*

Tanenbaum, Andrew S., Computer Networks, Prentice–Hall, Inc., pp. 273, 364–368, Dec. 1981.*

"The Wireless Application Protocol", Wireless Internet Today, Nov. 1998.

"Wireless Application Protocol Wireless Datagram Protocol Specification" (WAP WDP), Version 30, Apr. 1998.

"HDML 2.0 Language Reference", Version 2.0, Unwired Planet, Inc. Software Developer Kit, Jul. 1997.

"HDTP Draft Specification", Version 1.1, Unwired Planet, Inc. 1997.

* cited by examiner

Primary Examiner—Joseph H. Feild
(74) Attorney, Agent, or Firm—Beyer Weaver & Thomas, LLP (57) ABSTRACT

Improved techniques for providing reference numbers for purposes of fragmenting a message for transmission over a network (e.g., a wireless data network) that supports only a limited size message are disclosed. The reference numbers for the fragmented messages are shared by groups of destinations (e.g., subscribers or mobile devices). As a result, the number of reference numbers to be stored is small compared to the number of possible destinations, and the size of the reference numbers themselves is also kept small. The number of groupings and the size of the reference numbers can also be adjusted to fit system objectives.

22 Claims, 10 Drawing Sheets

METHOD AND APPARATUS FOR FRAGMENTING MESSAGES FOR A WIRELESS NETWORK USING GROUP SHARING OF REFERENCE NUMBERS

CROSS-REFERENCE TO RELATED APPLICATION

This application is a continuation-in-part of U.S. application Ser. No. 09/071,379, filed Apr. 30, 1998, and entitled "METHOD AND SYSTEM FOR INTEGRATING NARROWBAND AND WIDEBAND DATA TRANSPORTS" by Stephen S. Boyle, et al, the contents of which is hereby incorporated by reference.

BACKGROUND OF THE INVENTION

1. Field of the Invention

The present invention relates to wireless networks, and more particularly, to transmitting messages over wireless networks.

2. Description of the Related Art

Wireless networks are often used to transmit messages from one location in a network to a destination location in the network. These messages contain data to be supplied to the destination location. More specifically, the messages include a header portion and a data portion. The header portion includes an address of the destination location, and the data portion contains data. The header portion also indicates the size of the message. The destination location is, for example, a mobile device.

A wireless network, however, has a pre-defined or maximum message size that it is able to transmit efficiently through the wireless network. For example, one common wireless network, such as Short Messaging System (SMS) and Unstructured Supplementary Service Data (USSD), has a maximum size of 140 bytes. When a message to be transmitted has a size greater than the maximum message size for the wireless network, the message must be fragmented prior to transmission. More particularly, during fragmentation, the message is divided into smaller fragments or sub-messages. Each of the fragments or sub-messages has a size that is smaller than or equal to the maximum message size. After the fragments or sub-messages are formed, they are transmitted in order to the destination location.

Although the fragments or sub-messages are sent in order, the order in which they are received at the destination location is not always in sequential order. Each fragment can take seconds, minutes or hours to reach the destination location depending on the network traffic. As a result, each of the fragments or sub-messages includes (within the header portion) a sequence number that identifies the relative order of the particular fragment or sub-message within the message. The sequence number assists the destination location in reassembling the message from the message fragments or sub-elements.

Additionally, multiple messages may be concurrently received at a given destination location. The destination location needs some way to keep the fragments or sub-messages for the multiple messages separate. Conventionally, all the fragments or sub-messages for a given message include a particular reference number. In other words, each of the fragments or sub-messages for a given message will include a reference number of the same value in their header portion. The reference number thus allows the destination location to separate those fragments and sub-messages of different messages so that the multiple messages can be properly reassembled at the destination location.

Conventionally, the management and utilization of the reference numbers has some problems. With a wireless network, it is common that there are a large number of subscribers that can serve as destination locations. One conventional approach is to assign a unique reference number to each subscriber on the wireless network. However, with so many subscribers, the amount of data storage needed at a server (e.g., message server) just for all the reference numbers is large and costly. As an example, a wireless network with one million subscribers would need to store one million reference numbers. The large amount of data storage required with this approach is a problem.

Another conventional approach uses a single, large reference number for all transmission from a source location. For example, the large reference number can be 64 bits or more. The reference number needs to be large to minimize the likelihood that an overlap in reference number to the same destination location could occur. The problem with this approach is that the large size of the reference number consumes a significant portion of the bandwidth of each fragment or sub-message being transmitted.

Thus, there is a need for improved management and utilization of reference numbers for use in transmitting messages.

SUMMARY OF THE INVENTION

Broadly speaking, the invention relates to improved techniques for providing reference numbers for purposes of fragmenting a message for transmission over a network (e.g., a wireless data network) supporting only a limited size message. The reference numbers for the fragmented messages are shared by groups of destinations (e.g., subscribers or mobile devices). As a result, the number of reference numbers to be stored is small compared to the number of possible destinations, and the size of the reference numbers themselves is also kept small. The number of groupings and the size of the reference numbers can also be adjusted to fit system objectives.

The invention can be implemented in numerous ways, including as a method, a computer readable medium, an apparatus, and a system. Several embodiments of the invention are discussed below.

As a method for transmitting fragments of a message, an embodiment of the invention includes the operations of: receiving a message to be transmitted; obtaining a message size for the message; determining whether the message size is greater than a predetermined maximum size, determining a group number for the message; obtaining a reference number for the message based on the group number; fragmenting the message to form message fragments when the message size is determined to be greater than the predetermined maximum size, with each of the message fragments including the reference number; and thereafter transmitting the message fragments.

As a computer readable medium storing computer program code for transmitting fragments of a message, an embodiment of the invention includes: computer program code for receiving a message to be transmitted; computer program code for determining a group number for the message; computer program code for obtaining a reference number for the message based on the group number; computer program code for fragmenting the message to form message fragments, with each of the message fragments including the reference number; and computer program code for transmitting the message fragments.

As an apparatus for transmitting messages through a wireless data network to mobile devices, an embodiment of the invention includes: a message buffer, a group determination unit, a reference number table, a fragmentation unit, and a message transmission unit. The message buffer for storing a message to be transmitted to a particular mobile device. The group determination unit determines a group number for the message, where the group number identifies a group associated with the particular mobile device. The reference number table associates a different one of a plurality of reference numbers with each of the groups. The fragmentation unit receives a particular reference number from said reference number table based on the group number for the message and receives the message from the message buffer. The fragmentation unit then operates to fragment the message into sub-messages, with each of the sub-messages including the particular reference number and a portion of the message. The message transmission unit thereafter transmits the sub-messages to the particular mobile device.

The advantages of the invention are numerous. One advantage of the invention is that transmission of the appropriate reference number with each fragment or sub-message does not severely impinge upon the available transmission bandwidth because the reference number can be kept relatively small. Another advantage of the invention is that a server for receiving messages to be transmitted need not store large amount of data because only reference numbers for a limited number of groups need be stored. Still another advantage of the invention is that the size of the reference numbers and the number of groups which share reference numbers can both be adjusted as desired to meet system objectives.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for providing reference numbers for purposes of fragmenting a message for transmission over a network (e.g., a wireless data network) supporting only a limited size message. The reference numbers for the fragmented messages are shared by groups of destinations (e.g., subscribers or mobile devices). As a result, the number of reference numbers to be stored is small compared to the number of possible destinations, and the size of the reference numbers themselves is also kept small. The number of groupings and the size of the reference numbers can also be adjusted to fit system objectives.

Embodiments of the invention are discussed below with reference to FIGS. 1–7B. However, those skilled in the art will readily appreciate that the detailed description given herein with respect to these figures is for explanatory purposes as the invention extends beyond these limited embodiments.

Figure 1:
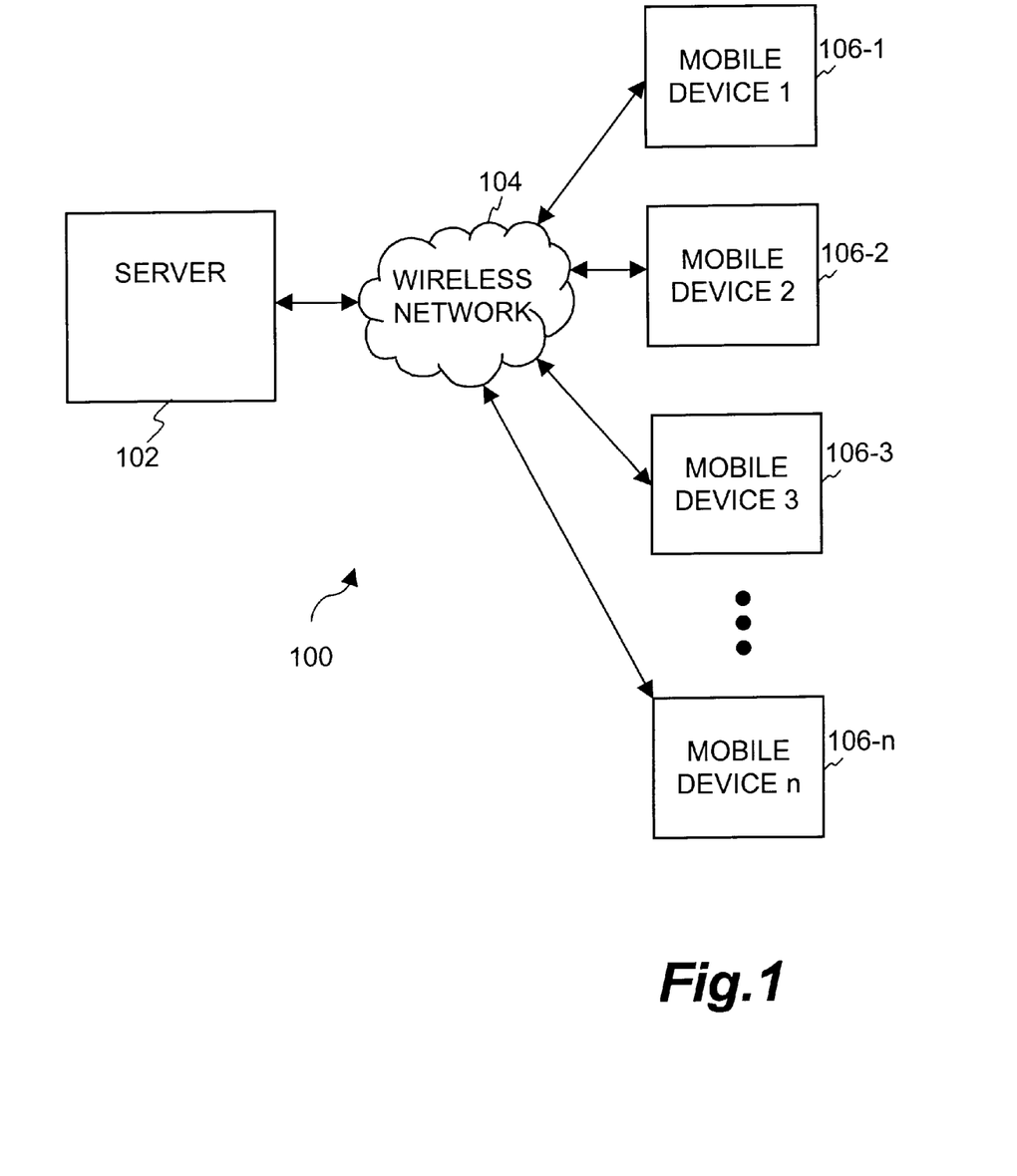
FIG. 1 is a block diagram of a wireless communication network according to an embodiment of the invention.

FIG. 1 is a block diagram of a wireless communication network 100 according to an embodiment of the invention. The wireless communication system 100 includes a sever 102, a wireless network 104, and mobile devices 106. There are n mobile devices 106-1 through 106-n. The server 102 is typically a computer system that operates to send and receive messages to and from the mobile devices 106. The messages are generally blocks of data that are to be transmitted to the mobile device 106. As examples, the data can pertain to various types of notifications, electronic mail, news data, etc. The server 102 may also connect to other wired or wireless networks to receive messages from or forward messages to other computer systems. As an example, the server 102 can be connected to the Internet. For example, the server 102 can be a link server coupled to the Internet or a network gateway coupled to a network.

The wireless network 104 typically uses radio transmissions to communicate with the mobile devices 106. The wireless network 104 can use a variety of different networks and communication protocols. Examples of wireless networks include Cellular Digital Packet Data (CDPD), Global System for Mobile Communications (GSM), Code Division Multiple Access (CDMA) and Time Division Multiple Access (TDMA) to name a few, and each of these wireless networks has different data transfer characteristics such as latency, bandwidth, protocols and connection methods. As examples, protocols can be Internet Protocol (IP), Short Messaging System (SMS) and Unstructured Supplementary Service Data (USSD), and connection methods can include packet switched or circuit switched.

As an example, a message to be sent by the server 102 to the mobile device 106-2 would contain an address that particularly identifies the mobile device 106-2. The message is then provided by the server 102 to the wireless network 104. For example, a typical wireless data network is a packet switched networks using a Small Message Server Center (SMSC) which has a maximum packet size of 140 bytes. The wireless network 104 causes the message to be properly routed to the mobile device 106-2 (i.e., in accordance with the address). The transmission between the wireless network 104 and mobile device 106-2 is wireless. The mobile device 106-2 receives the message that has been transmitted the wireless network 104. The mobile device 106-2 can then store the message and perform predetermined processing actions such as, for example, notifying a user of the mobile device 106-2 of the reception of the message.

The messages that are transmitted to the mobile devices 106 via the wireless network 104 are often limited in size due to the wireless network 104. For example, when the wireless network 104 is a wireless data network using packet switching, then there is a maximum packet size for use on the wireless network 104. As such, if a message is larger than the maximum packet size for the wireless network 104, then the message must be fragmented for transmission and then later reassembled upon reception. In effect, then, fragmentation is a process that divides a message into several smaller sub-messages, such that each of the sub-messages is able to fit within a single packet of the wireless network 104. The sub-messages are then transmitted in order to the appropriate one of the mobile devices 106. Thereafter, at the mobile device 106, the sub-messages are reassembled to form the original message. Additional details on the fragmentation of a message to be transmitted are provided below with reference to FIGS. 2–4.

Figure 2:
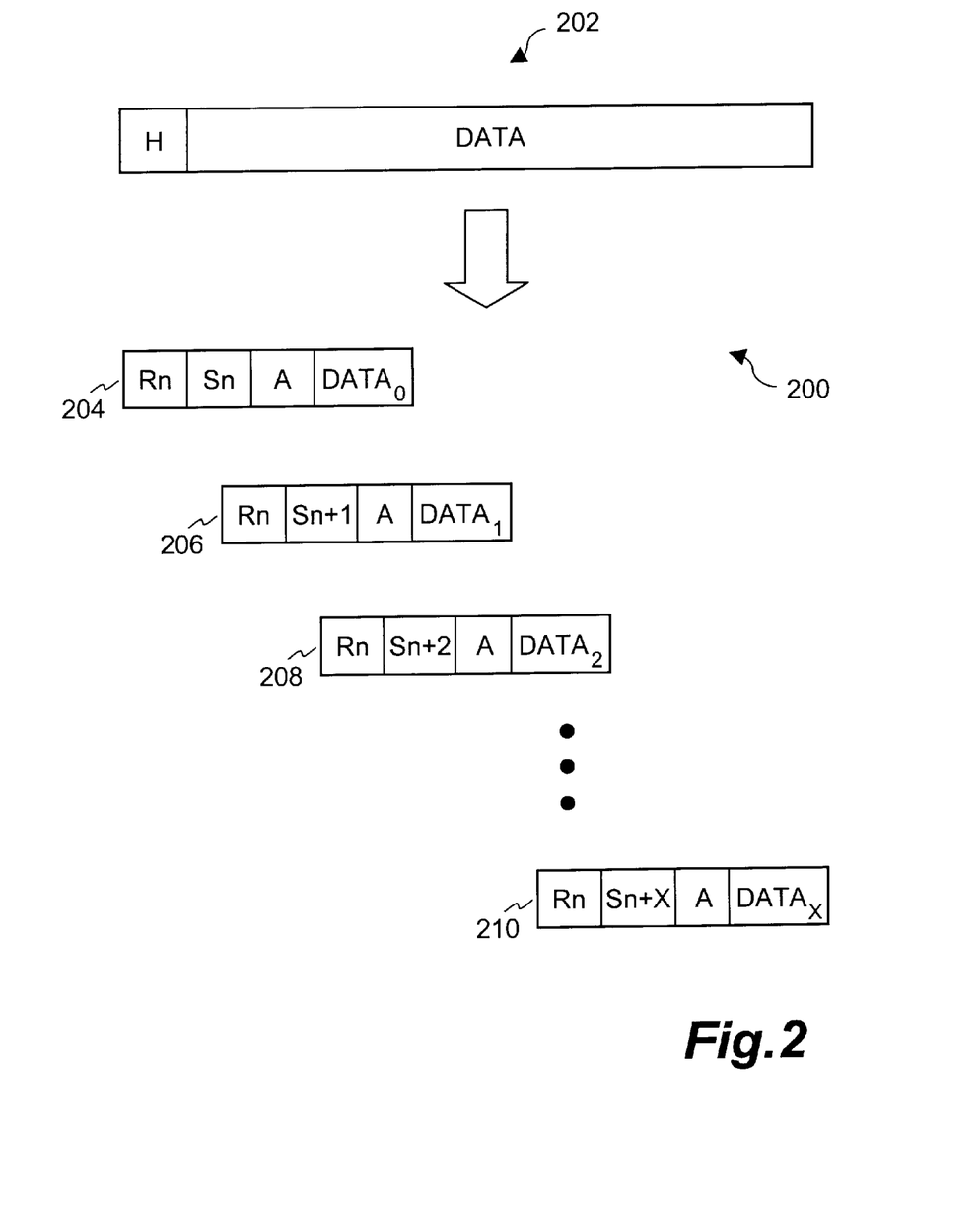
FIG. 2 illustrates a fragmentation process according to an embodiment of the invention.
Figure 3A:
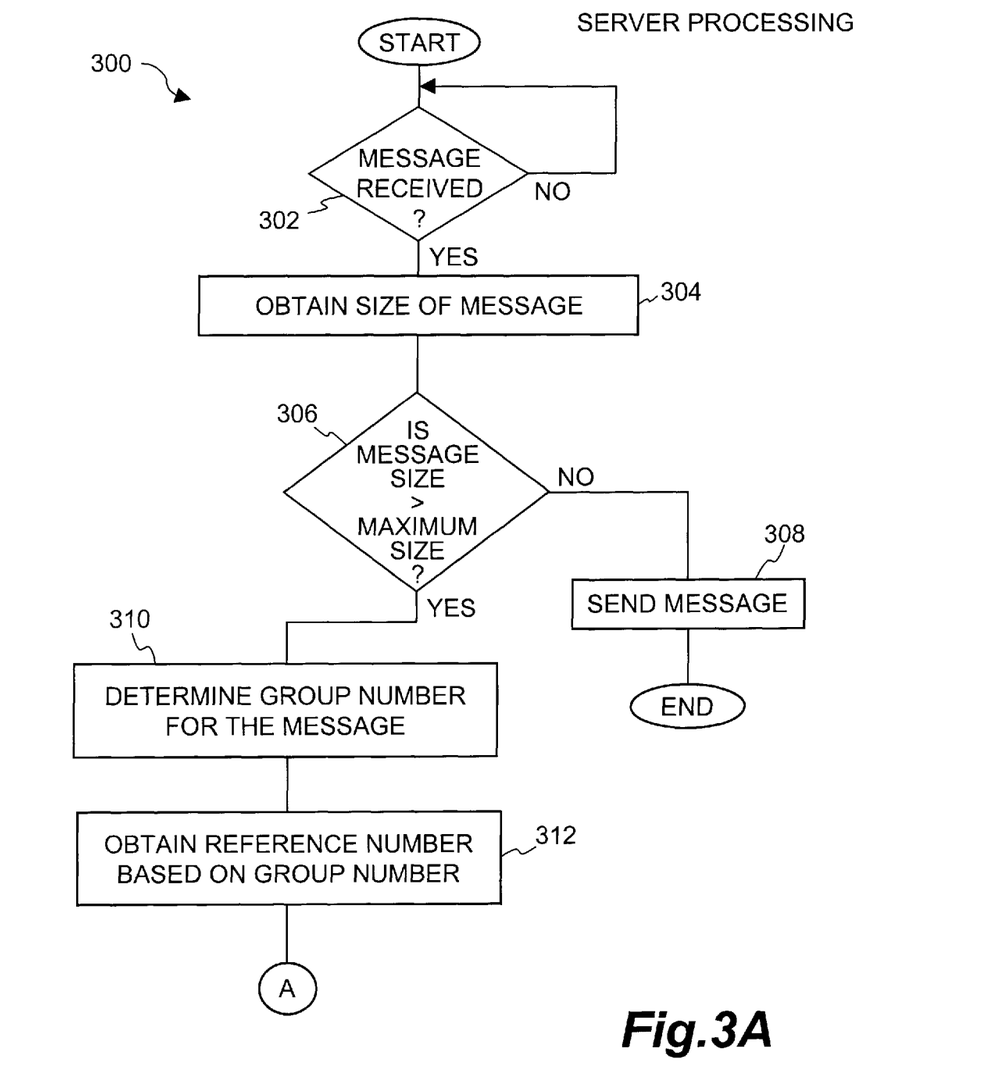
FIGS. 3A and 3B are flow diagrams of server processing according to an embodiment of the invention.
Figure 3B:
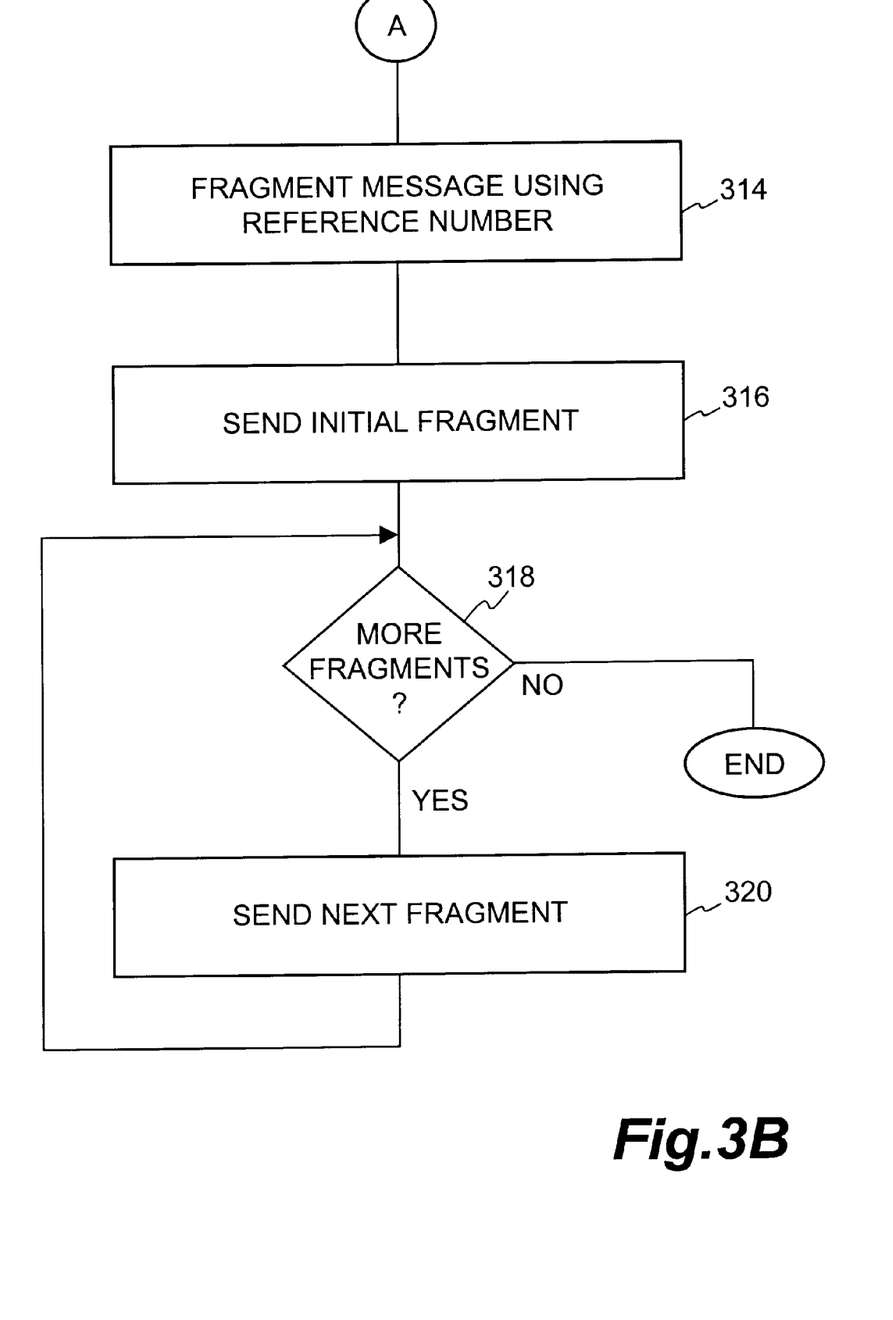
Figure 4:
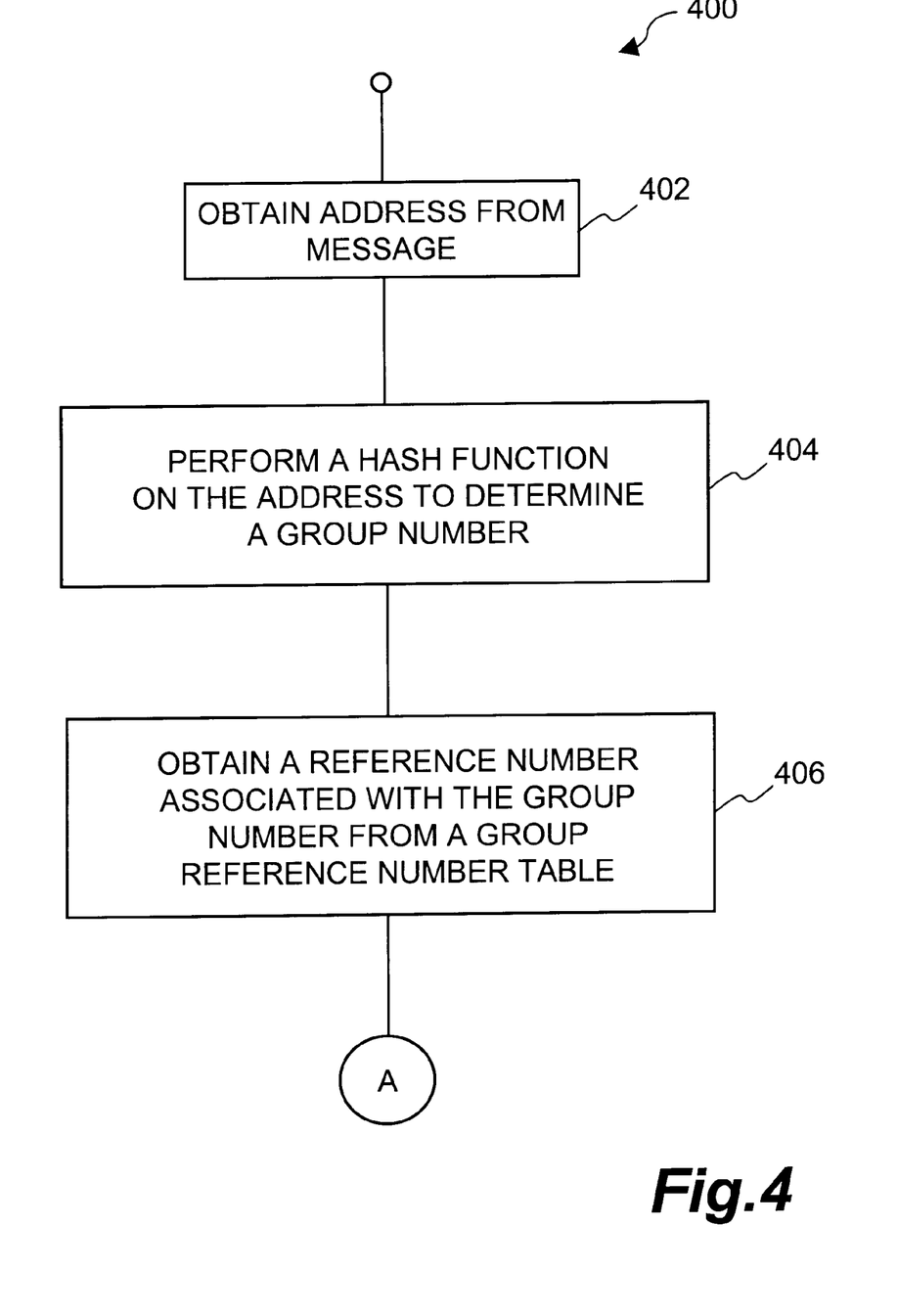
FIG. 4 is a partial flow diagram of reference number determination processing according to another embodiment of the invention.

FIG. 2 illustrates a fragmentation process 200 according to an embodiment of the invention. An original message 202 that is to be transmitted is provided to a server, such as the server 102 illustrated in FIG. 1. The message 202 generally has a format that includes a header portion (H) and a data portion (DATA). It is assumed that the message 202 has a size that exceeds a maximum packet size for the wireless data network (e.g., the wireless network 104 illustrated in FIG. 1). As such, the message 202 needs to undergo a fragmentation process to produce multiple smaller sub-messages. According to the fragmentation process 200 illustrated in FIG. 2, the original message 202 is fragmented to form x sub-messages. Of the x sub-messages, sub-messages 204, 206, 208 and 210 are illustrated in FIG. 2. The representative format for each of the sub-messages 204, 206, 208 and 210 includes a reference number (Rn), a series number (Sn), an address (A), and data (DATA). For example, for the sub-message 210, the format includes the reference number (Rn), the series number (Sn+x), the address (A), and the data ($DATA_x$). Note that for each of the fragments or sub-messages, the reference number (Rn) is the same because it refers to the original message 202. The reference number (Rn) is used to ensure that the mobile device 106 receiving the fragments or sub-messages from various different messages is able to reassemble the fragments or sub-messages to form the appropriate messages. The series number (Sn) typically starts at 0 or 1 and is incremented with each successive fragment or sub-message. The series number (Sn) thus identifies the number of the fragment or sub message for a given message which is also needed for reassembly. The address (A) is the same for all of the fragments or sub-messages because the address (A) points to a particular one of the mobile devices 106 that is to receive the original message 202. The data ($DATA_0$–$DATA_x$) in each of the fragments or sub-messages is different and represents a portion of the data (DATA) associated with the original message 202. FIGS. 3A, 3B and 4 detail the transmission and reception of an original message in a fragmented fashion.

FIGS. 3A and 3B are flow diagrams of server processing 300 according to an embodiment of the invention. The server processing 300 is, for example, performed by the server 102 illustrated in FIG. 1. In general, the task of the server processing 300 is to forward any messages received to the appropriate mobile devices.

The server processing 300 initially begins with a decision block 302 that determines whether a message has been received. If the decision block 302 determines that a message has not been received, then the server processing 300 awaits the reception of a message. On the other hand, when the decision block 302 determines that a message has been received, then the server processing 300 continues to process the message.

Once a message has been received, the size of the message is obtained 304. Typically, the message has a header portion and a data portion. Among other things, the header portion contains the size of the message. A decision block 306 then determines whether the size of the message is greater than a predetermined maximum size. The predetermined maximum size corresponds with a maximum packet size for a wireless data network. The wireless data network can, for example, be a packet switched network or a circuit switched network. In the case where the wireless data network is a narrowband packet switched network (e.g., SMS network), a typical maximum size would be 140 bytes. In the case where the wireless data network is a circuit switched network, a typical maximum size would be 1492 bytes. When the decision block 306 determines that the message size is not greater than the predetermined maximum size, then fragmentation is not required. Hence, in such cases, the message is sent 308 to the appropriate mobile device via the wireless data network. Following block 308, the server processing 300 is complete and ends.

On the other hand, when the decision block 306 determines that the message size is greater than the predetermined maximum size, then fragmentation is required. The fragmentation of the message is then performed as follows. The server processing 300 initially determines 310 a group number for the message. The group number identifies one of a plurality of groups of mobile devices, with each of the groups containing a different set of mobile devices. After the group number is determined 310, a reference number is obtained 312 based on the group number. The reference number obtained is used to transmit all the fragments of the message to the mobile device that is to receive the message. The size of the reference number can vary but is, for example, on the order of 8–16 bits. After obtaining the reference number the message can be fragmented 314 using the reference number. In other words, as illustrated in FIG. 2, the reference number is obtained and then used to encode within the fragments or sub-messages a reference (i.e., reference number) to a particular original message such that the mobile device upon receiving the fragments or sub-messages is able to reconstruct the original message. As shown in FIG. 2, each fragment or sub-message for a given message includes the same reference number (Rn).

After the fragments or sub-messages are created, an initial fragment is sent 316 to the appropriate mobile device. The appropriate mobile device is that mobile device having the same address as the address contained in the initial fragment. Next, a decision block 318 determines whether there are additional fragments to be sent. When the decision block 318 determines that there are additional fragments to be sent, a next fragment is then sent 320. Again, the next fragment is sent 320 to the appropriate mobile device in the same manner as was the initial fragment. Following block 320, the server processing 300 returns to repeat the decision block 318 and subsequent blocks. When the last fragment comes, a flag in the last fragment indicating the end of the message is turned on. The flag helps the appropriate mobile device to properly reconstruct the message from the sequence of received fragments. Once the decision block 318 determines that there are no more fragments to be sent, then the server processing 300 is complete and ends.

FIG. 4 is a partial flow diagram of reference number determination processing 400 according to another embodiment of the invention. The reference number determination processing 400 is, for example, suitable for use for blocks 310 and 312 of the server processing 300 illustrated in FIG. 3A. The reference number determination processing 400 operates to initially obtain 402 an address from the message. As noted previously, the message contains an address in its header portion. Hence, in block 402, the address is obtained from the message. After the address for the message is obtained, then a hash function is performed 404 on the address to determine a group number. Here, the hash function is used to select a group number based on the address of the message. In one embodiment, the group number is in effect randomly chosen by the hash function which uses the address of the mobile device that is to receive the message as an input to the hash function. In one embodiment, the address input to the hash function can include the address of the mobile device and a port number. In wireless networks, the address of the mobile device is typically an Internet Protocol (IP) address or a phone number (i.e., MSISDN number).

Once the group number is determined, a reference number associated with the group number is obtained 406 from a group number reference table. For each group number, there is a reference number of a certain size that is used with a fragmented message to inform the mobile device receiving the fragments that they belong to a particular message. Each time the reference number is used in sending a message to a mobile device within a particular group, the reference number is incremented. An exemplary group number reference table is illustrated below with respect to Table 1. Thereafter, the reference number determination processing 400 is completed and processing thereafter follows the processing of the server processing 300 beginning with block 314 in FIG. 3B.

Although block 404 used a hash function to determine the group number, a variety of other operations can be performed to determine the group number. It was noted above that one suitable hash function provides an essentially random distribution of the mobile devices to the groups. Some other more complicated approaches to determine the group number for mobile devices can include statistical analysis of traffic on the wireless data network to the mobile devices. Another approach would be to estimate the traffic to mobile devices based on the amount of services subscribed to by the mobile devices. In such cases, measured or estimated traffic load can be used to balance the message load across the groups by appropriately assigning the mobile devices to groups.

Table 1 below illustrates a representative reference number table suitable for use with the reference number determination processing 400 illustrated in FIG. 4.

TABLE 1

| Reference Number | Group Number |
| --- | --- |
| $Rn_1$ | $GP_1$ |
| $Rn_2$ | $GP_2$ |
| $Rn_3$ | $GP_3$ |
| $Rn_4$ | $GP_4$ |
| $Rn_5$ | $GP_5$ |
| . | . |
| . | . |
| . | . |
| $Rn_j$ | $GP_j$ |

An example of how the reference number table is utilized is described below. For example, in a wireless network supporting one million subscribers, a reference number table can have 256 entries, with each entry containing a 16 bit unsigned integer for one of the groups. In such an embodiment, on average, each of the 256 groups support about 3906 subscribers. The 16 bit unsigned integer provides 65,536 unique reference numbers before repeating. Given that there are only 3906 subscribers (instead of one million), the 16 bits for the reference number is sufficiently large to effectively prevent the same mobile device from ever receiving two messages with the same reference number and thus be unable to reassemble the messages.

Assume that the input to the hash function is an address (i.e., IP address) and a port number. A representative hash function is then an exclusive-OR of all four bytes of the IP address ($IP_1$, $IP_2$, $IP_3$ and $IP_4$) and all two bytes of the port number ($P_1$ and $P_2$), namely in accordance with Equation 1 below.

$$IP_1 \oplus IP_2 \oplus IP_3 \oplus IP_4 \oplus P_1 \oplus P_2 = \text{hash value} \qquad (1)$$

For example, if the IP address is "204.163.165.111" and the port number is "8502", then the hash value (or hash result) is 178. Specifically, the hash value is determined as follows:

$$11001100 \oplus 10100011 \oplus 10100101 \oplus 01101111 \oplus 00100001 \oplus 00110110 = 10110010 = 178$$

Thus, the reference number stored in the $178^{th}$ entry of the reference number table is selected for the message to be sent to the address and the port number. Hence, all the fragments or sub-messages for the message will include the selected reference number.

After the selected reference number is retrieved from the reference number table, the reference number stored in the reference number table is incremented. For example, if the reference number stored in the $178^{th}$ entry of the reference number table when read is 10, then after the reference number is read, the stored reference number is incremented to 11. As a result, the next message directed to the same group will receive a different reference number. Thus, the likelihood that the same mobile device would ever receive two messages with the same reference number is very low.

Figure 5:
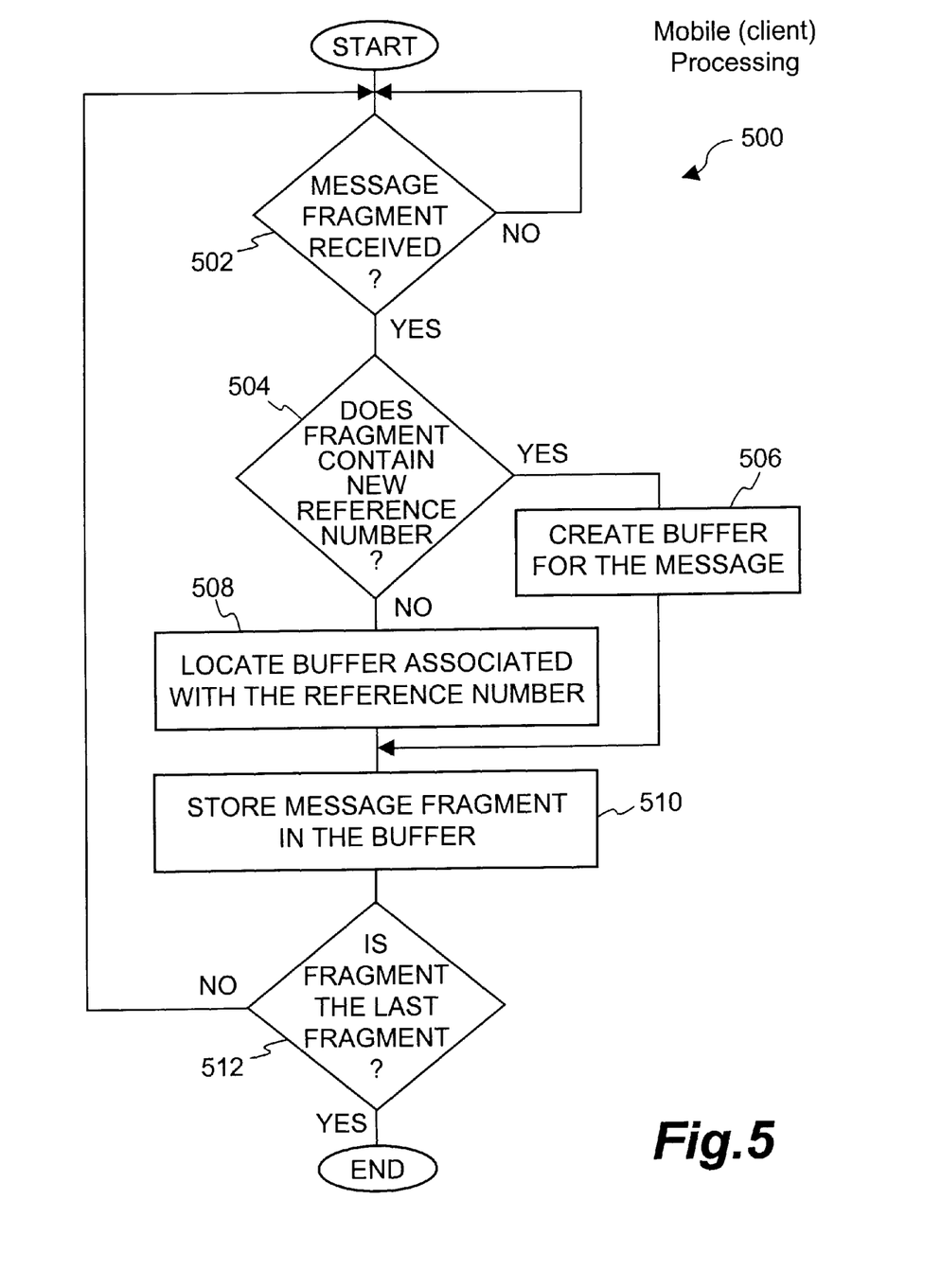
FIG. 5 is a flow diagram of mobile message processing according to an embodiment of the invention.

FIG. 5 is a flow diagram of mobile message processing 500 according to an embodiment of the invention. The mobile message processing 500 concerns the reception of messages transmitted in a fragmented manner. The mobile message processing 500 is, for example, performed by the mobile devices 106 illustrated in FIG. 1.

The mobile message processing 500 initially beings with a decision block 502 that determines whether a message fragment (or sub-message) has been received. When the decision block 502 determines that no message fragment has been received, then the mobile message processing 500 awaits the reception of a message fragment. On the other hand, once the decision block 502 determines that a message fragment has been received, the mobile message processing 500 continues.

When the mobile message processing 500 continues, a decision block 504 determines whether the message contains a new reference number. When the decision block 504 determines that the message fragment does contain a new reference number, then a buffer is created 506 for the message. The reference number is considered new when the mobile device is not already processing the reception of fragments of a message that are using the same reference number. On the other hand, when the decision block determines that the message fragment does not contain a new reference number, then the buffer associated with the reference number of the message fragment is located 508.

Following either block 508 or block 506, the message fragment is stored 510 in the appropriate buffer. Note that for each incoming message fragment, the reference number serves to not only indicate whether the mobile device is already processing the message but also whether or not a new buffer is required for a new message or where the appropriate buffer already created is located for storing the subsequent message fragments.

Following block 510, a decision block 512 determines whether the message fragment is the last fragment of the message. There are a variety of different ways for the mobile message processing 500 to determine whether the message fragment is the last fragment of the message. One example is for the fragments or sub-messages to indicate the total number of fragments associated with the message, and then have the mobile message processing 500 count the number of fragments that have been stored in the appropriate buffer. In any event, when the decision block 512 determines that the message fragment that has been received is not the last fragment for the message, then the processing returns to repeat the decision block 502 and subsequent blocks for each of the remaining message fragments that are still to be received. Because the message fragments often arrive at the mobile device out of order, the determination in block 512 of whether the last fragment has been received concerns whether all the fragments of a given message have been received, regardless of the order in which they were received. Once the decision block 512 determines that the message fragment received is the last message fragment for the message then a mobile message processing 500 is complete and ends.

The mobile message processing 500 is, for example, described with respect to the reception of message fragments from a single message. However, those skilled in the art should recognize that often the mobile device operates to receive message fragments from multiple messages and thus the fragments tend to come out of order and overlapped with other different messages. Hence, the mobile message processing 500 can operate to track the number fragments received for each of the messages as well as the buffer locations where the fragments of the messages are stored. Once all of the message fragments for a particular message are received, then the mobile message processing 500 is complete as with respect to that particular message, but other messages may be ongoing and thus the processing would continue for those messages.

Figure 6A:
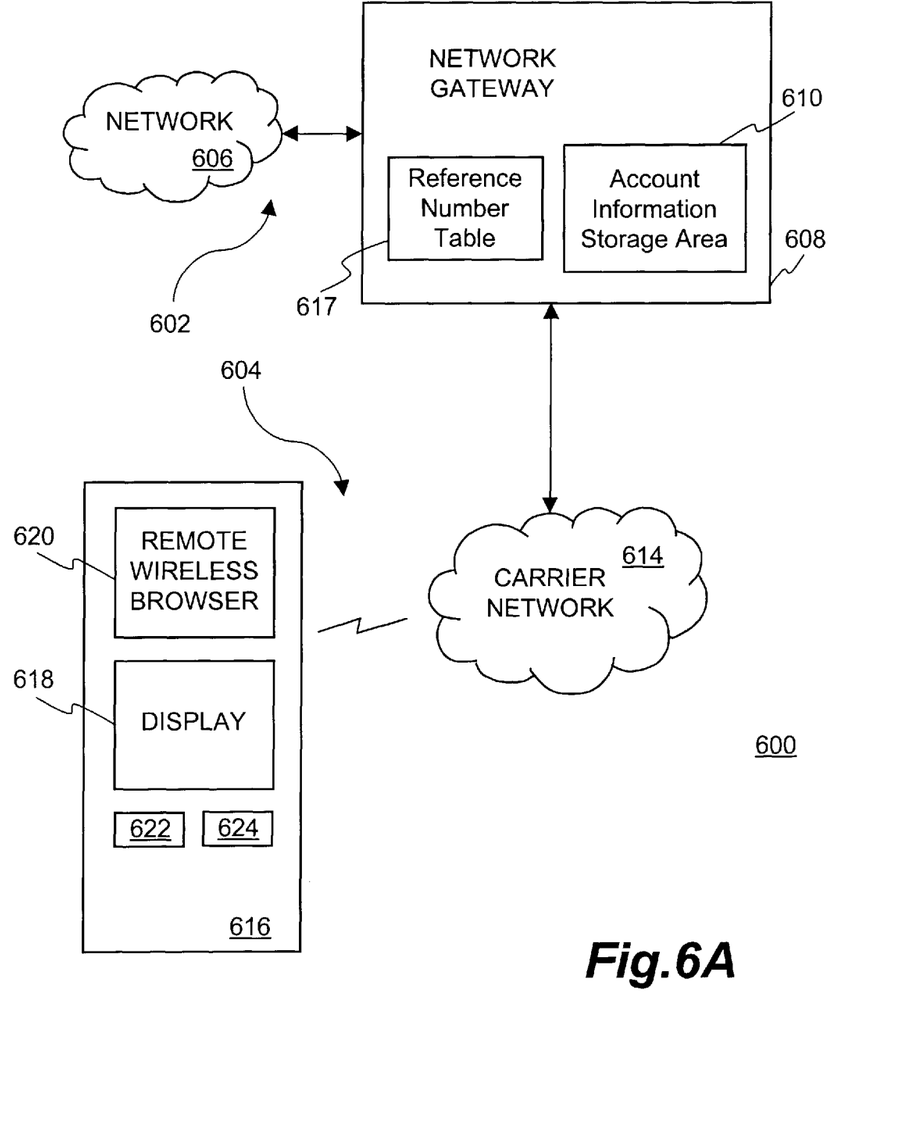
FIG. 6A is a block diagram of a representative communication system for use with the invention.

FIG. 6A is a block diagram of a representative communication system 600 for use with the invention. The communication system 600 includes a wired section 602 and a wireless section 604. The wired section 602 includes a network 606 and a network gateway 608. In one embodiment, the network 606 is the Internet, which represents a large number of interconnected computers. In another embodiment, the network 606 is an intranet or private network of computers.

The network gateway 608 operates to provide a gateway from the wired section 602 and the wireless section 604. The network gateway 608 serves as a primary transition point between the wireless communication of the wireless section 604 and the wired communication of the wired section 604. The network gateway 608 receives the incoming content request from the carrier network 614 and performs protocol conversion as necessary. The network gateway 608 will normally perform some protocol translation and other account management and verification operations. The network gateway 608 includes an account information storage area 610 that stores account, configuration and other information. The wireless section 604 includes a carrier network 614 and at least one remote wireless computing device 616.

According to the invention, the network gateway 608 also receives messages from the network 606 and forwards them to the appropriate remote computing devices. In such case, the network gateway 608 also stores a reference number table 617 to provide for the sharing of reference numbers among a group of mobile devices.

The remote computing device 616 can, for example, be a mobile phone, a Personal Digital Assistant (PDA), or a portable general purpose computer. The remote wireless computing device 616 includes a display 618 for displaying screens or pages of information, a remote wireless browser 620, and navigation buttons 622 and 624. The remote wireless browser 620 is usually an application program that executes on the remote computing device 616. The remote wireless browser 620 provides the screens or pages of information to be displayed on the display 618. The navigation buttons 622 and 624 allow a user to navigate through or make selections from menus or lists being displayed on the display 618 by the remote wireless browser 620. The remote wireless computing device 616 can also include an alphanumeric keypad (not shown) that allows a user to enter alphanumeric information with respect to the mobile telephone 616, though such is not necessary as alphanumeric information can also be entered using a dial screen displayed on the display 618 with selections being made using the navigation buttons 622 and 624. By interacting with the remote wireless browser 620, a user is able to access information located on the network 606.

Typically, the wireless section 604 will include a plurality of remote wireless browsers 620, each of which executes on a different remote computing device. The configuration and other information stored in the account information storage area 610 can store service limitations, security limitations, preference information, screen configuration information, and the like for each of the remote wireless browsers 620. The account information storage area 610 can also store data or pages of data that are of interest to the remote wireless browsers 620. The stored data or pages can operate as a cache of information previously requested from the network 606 or can operate as an information server within the network gateway 608. For example, as an information server, the storage pages can represent pages to be displayed by the remote wireless browsers.

Figure 6B:
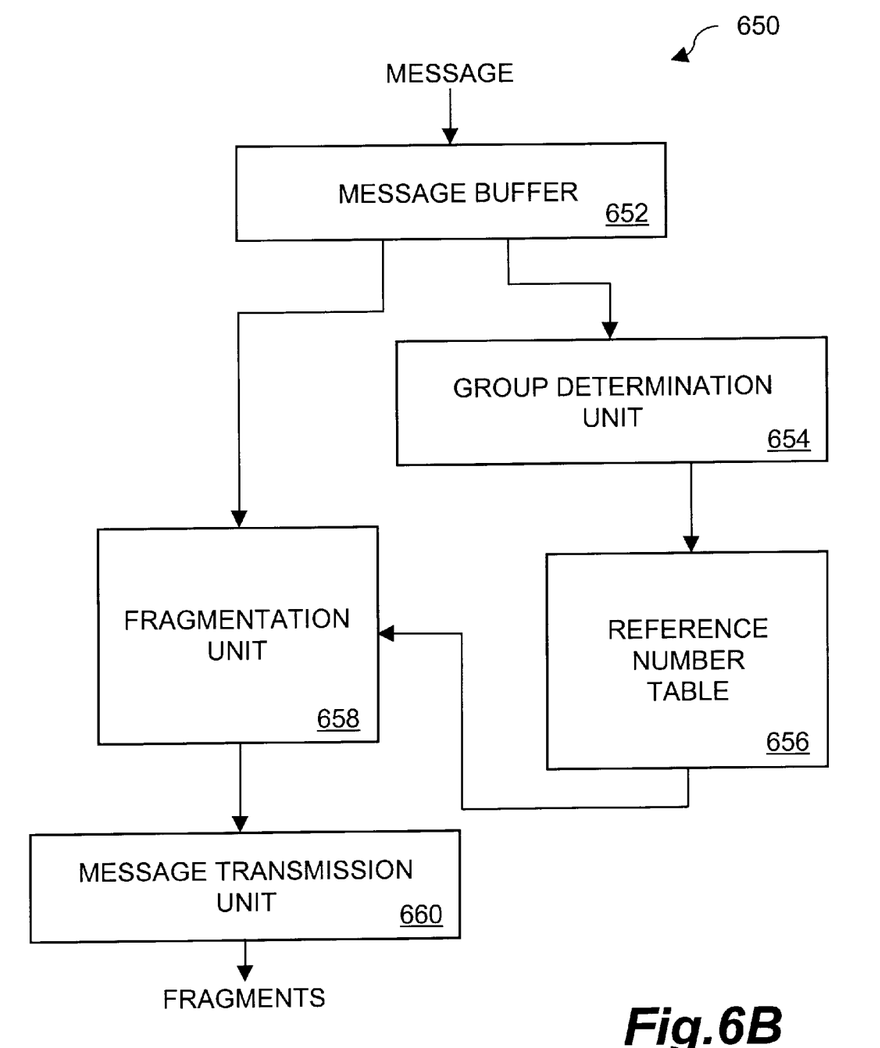
FIG. 6B is a block diagram of a message server according to an embodiment of the invention.

FIG. 6B is a block diagram of a message server 650 according to an embodiment of the invention. The message server 650 is, for example, includes within the server 102 illustrated in FIG. 1 or the network gateway 608 illustrated in FIG. 6A.

The message server 650 operates to receive messages to be transmitted to mobile devices, fragments the messages as necessary, and then transmits the messages to the appropriate mobile device through a wireless data network. The message server 650 includes a message buffer 652 that receives and stores an incoming message. A group determination unit 654 determines a group number for the message. The group number identifies a group associated with the particular mobile device. There are a plurality of mobile devices within each of the groups. A reference number table 656 stores a different reference number for each of the groups. Once the group number is determined, a suitable reference number is read from the reference number table 656. A fragmentation unit 658 receives a particular reference number from said reference number table based on the group number for the message and receives the message from the message buffer. The fragmentation unit 658 then operates to fragment the message into sub-messages, with each of the sub-messages including the particular reference number and a portion of the message. A message transmission unit 660 receives the sub-messages from the fragmentation unit 658 and then transmits the sub-messages to the appropriate mobile device.

Figure 7A:
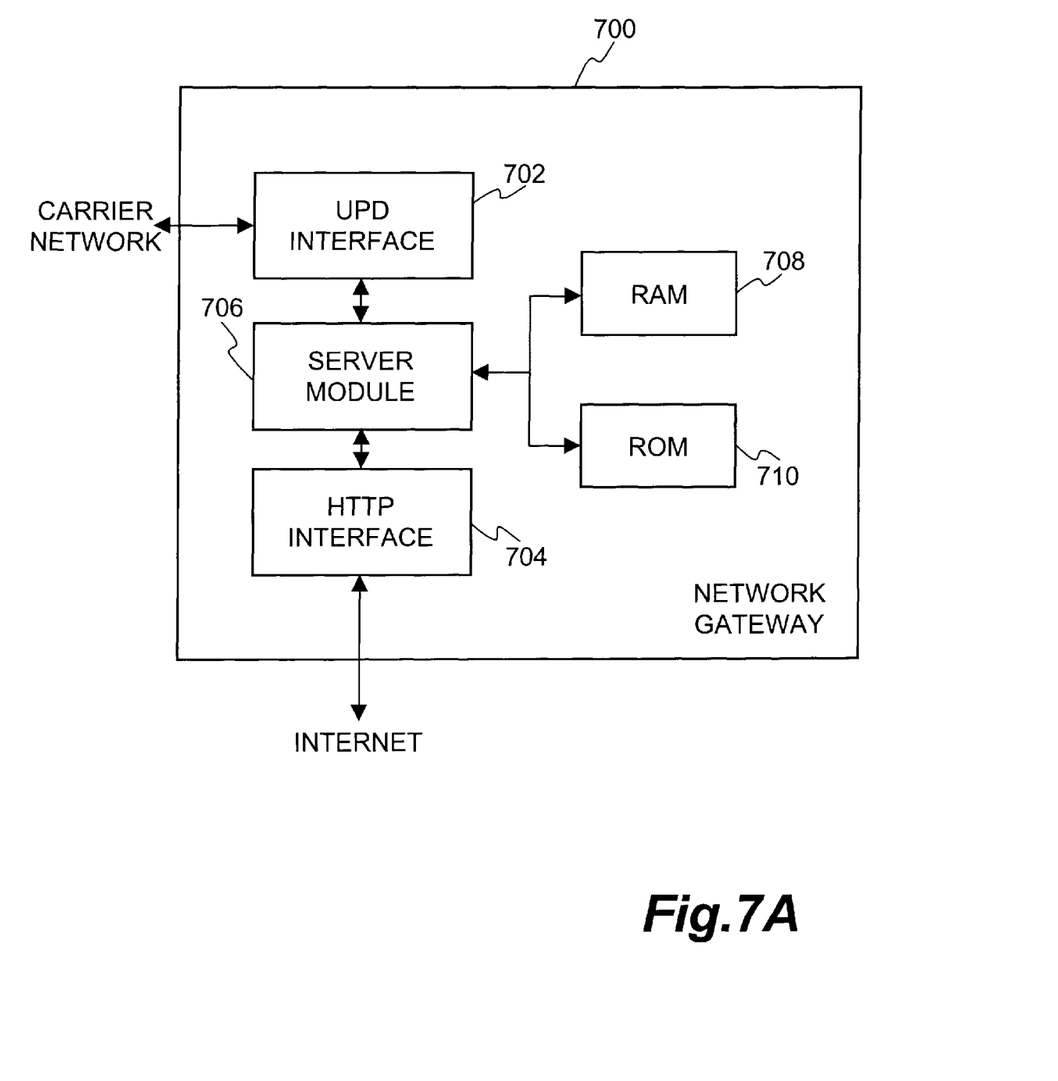
FIG. 7A is a block diagram of a network gateway suitable for use with the representative communication system illustrated in FIG. 6.

FIG. 7A is a block diagram of a network gateway 700 suitable for use with the representative communication system 600 illustrated in FIG. 6. The network gateway 700 can, for example, represent the network gateway 708 illustrated in FIG. 6 which is typically a server computer. To avoid obscuring aspects of the present invention, well known methods, procedures, components, and circuitry in the network gateway 700 are not described in detail.

The network gateway 700 includes a User Datagram Protocol (UDP) interface 702 that couples to the carrier network 614, an HTTP interface 704 that couples to the network 606, and a server module 706 coupled between the UDP interface 702 and the HTTP interface 704. The server module 706 performs traditional server processing pass as well as protocol conversion processing. In particular, the protocol conversion processing includes protocol conversion between UDP and HTTP. The server module 706 also performs the processing associated with message fragmentation and delivery described above with respect to FIGS. 3A–4. Further, to assist the server module 706 in its processing, the proxy server 700 includes a random access memory (RAM) 708 and a read-only memory (ROM) 710. Among other things, the RAM 708 will store device identifiers, subscriber identifiers, configuration information, and alias conversion information. In one embodiment, such information is stored in the RAM 710 as a database. Also, the RAM 710 can represent the account information storage area 610 illustrated in FIG. 6. Either the RAM 708 or the ROM 710 can be used to store the reference number table 617 illustrated in FIG. 6.

Figure 7B:
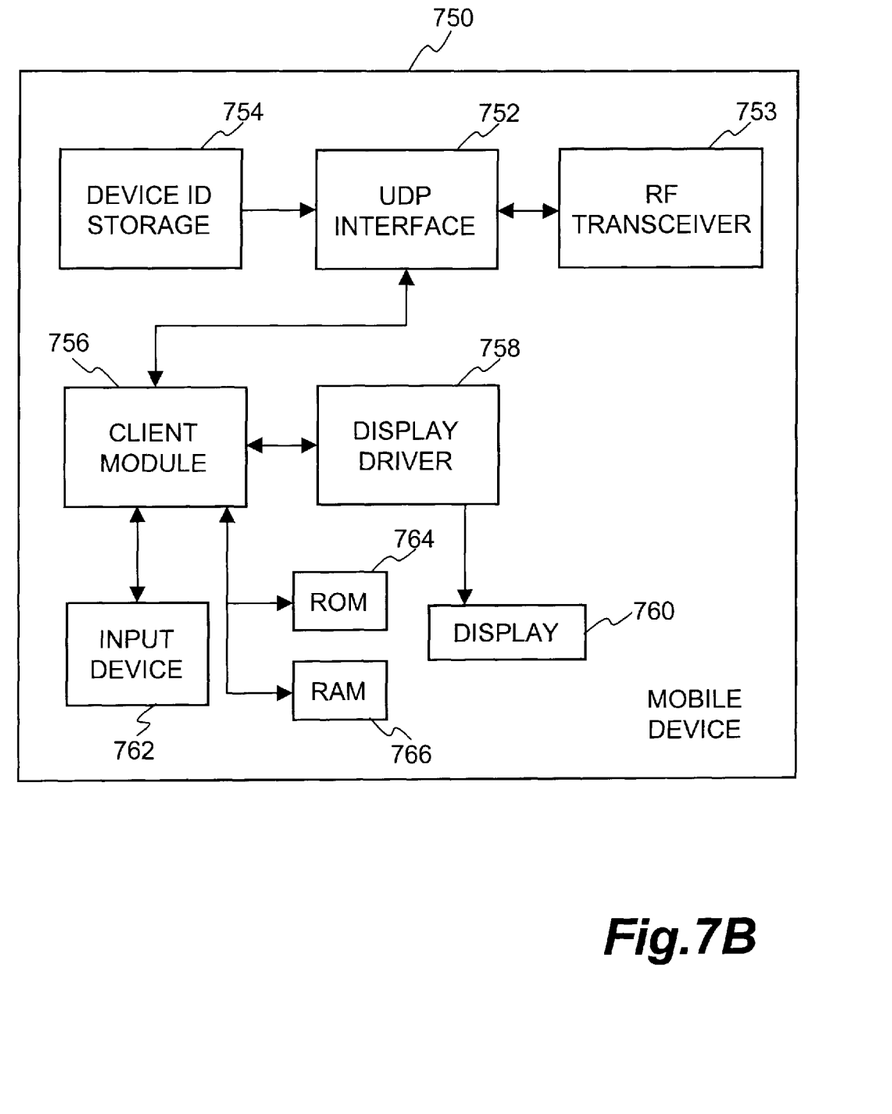
FIG. 7B is a block diagram of mobile device suitable for use with the representative communication system illustrated in FIG. 6.

FIG. 7B is a block diagram of mobile device 750 suitable for use with the representative communication system 600 illustrated in FIG. 6. The mobile device 750 can, for example, correspond to the remote computing device 618 that operates the remote wireless browser 616 illustrated in FIG. 6.

The mobile device 750 includes a UDP interface 752 that couples to the carrier network 614 via a RF transceiver 753 to receive incoming and outgoing signals. A device identifier (ID) storage 754 supplies a device ID to the UDP interface 752. The device ID identifies a specific code that is associated with a particular mobile device 750. In addition, the mobile device 750 includes a client module 756 that performs many of the processing tasks performed by the mobile device 750 including establishing a communication session with the carrier network 714 and the network gateway 608, requesting and receiving data (e.g., pages) from the network 606, displaying information on a display of the remote computing device, and receiving user input. The client module 756 is coupled to the UDP interface 752 for the establishment of a communication session and the requesting and receiving of data. The client module 756 also performs the processing associated with the reception of the messages transmitted from the gateway computer 608, 700, including the reassembling of messages from fragments or sub-messages. The client module 756 controls the display driver 758 to display information on the display 760 to the user. Additionally, the client module 756 is coupled to an input device 762, a ROM 764, and a RAM 766. Preferably, among other things, the client module 756 operates a network browser, such as a Handheld Device Markup Language (HDML) web browser. The input device 762 allows a user of the mobile device 750 to input data and thus make selections in controlling and using the mobile device 750. The ROM 764 stores predetermined data and processing instructions for the client module 756. The RAM 766 is used to provide temporary data storage for incoming and outgoing data being received and transmitted.

Although embodiments of the network gateway 700 and the mobile device 750 described in FIGS. 7A and 7B using UDP and HTTP protocols, it should be recognized that other protocols and other protocol stacks can be provided and utilized. Additional details on the design and construction of the network gateway 700 and the mobile device 750 are contained in U.S. patent application Ser. No. 08/570,210 entitled "METHOD AND ARCHITECTURE FOR AN INTERACTIVE TWO-WAY DATA COMMUNICATION NETWORK" by Alain Rossmann, which is hereby incorporated by reference in its entireties.

The advantages of the invention are numerous. One advantage of the invention is that transmission of the appropriate reference number with each fragment or sub-message does not severely impinge upon the available transmission bandwidth because the reference number can be kept relatively small. Another advantage of the invention is that a server for receiving messages to be transmitted need not store large amount of data because only reference numbers for a limited number of groups need be stored. Still another advantage of the invention is that the size of the reference numbers and the number of groups which share reference numbers can both be adjusted as desired to meet system objectives.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transmitting a message over a data network having a preferred message size, said method comprising:

receiving the message to be transmitted over the data network, the message including at least message data;

obtaining a message size for the message;

determining whether the message size is greater than the preferred message size;

determining a group number for the message;

obtaining a reference number for the message based on the group number;

fragmenting the message to a plurality of message fragments when the message size is determined to be greater than the preferred message size, each of the plurality of the message fragments having a length not longer than the preferred message size and including at least a portion of the message data and the reference number but not including the group number; and thereafter transmitting the message fragments sequentially over the data network.

2. A method as recited in claim 1, wherein each of the plurality of message fragments comprises a destination address included in the message and a sequence number to signify an order in the message.

3. A method as recited in claim 1, wherein said obtaining the reference number for the message comprises:

indexing into a reference number table using the group number to select one of a plurality of reference numbers within the reference number table, each of the reference numbers being associated with a different group.

4. A method as recited in claim 3, wherein said determining of the group number comprises:
  obtaining an address from the message; and
  determining the group number based on the address from the message.

5. A method as recited in claim 4, wherein each of the plurality of message fragments comprises the address and a sequence number to signify an order in the message.

6. A method for transmitting a message over a data network having a limited message size, said method comprising:
  receiving the message to be transmitted over the data network;
  obtaining a message size for the message;
  determining whether the message size is greater than the limited message size;
  determining a group number for the message, said determining of the group number includes at least obtaining the destination address from the message, and determining the group number based on the destination address from the message;
  obtaining a reference number for the message based on the group number;
  fragmenting the message to a plurality of message fragments when the message size is determined to be greater than the limited message size, each of the plurality of the message fragments having a length not longer than the limited message size and including the reference number; and
  thereafter transmitting the message fragments sequentially over the data network.

7. A method for transmitting a message over a data network having a preferred message size, said method comprising:
  receiving the message to be transmitted over the data network;
  obtaining a message size for the message;
  determining whether the message size is greater than the preferred message size;
  determining a group number for the message, said determining of the group number includes at least obtaining an address from the message, and performing a hash function on the address from the message to determine the group number for the message;
  obtaining a reference number for the message based on the group number;
  fragmenting the message to a plurality of message fragments when the message size is determined to be greater than the preferred message size, each of the plurality of the message fragments having a length not longer than the preferred message size and including the reference number; and
  thereafter transmitting the message fragments sequentially over the data network.

8. A method as recited in claim 7, wherein the hash function operates substantially randomly with respect to determining the group number from the address from the message.

9. A method as recited in claim 7, wherein said obtaining the reference number for the message comprises:
  indexing into a reference number table using the group number to select one of a plurality of reference numbers within the reference number table, each of the reference numbers being associated with a different group.

10. A computer readable medium storing computer program code for transmitting a message over a data network having a limited message length, the message being transmitted to a receiving device, said computer readable medium comprising:
  computer program code for receiving the message to be transmitted the message including at least message data;
  computer program code for determining a group number for the message;
  computer program code for obtaining a reference number for the message based on the group number;
  computer program code for fragmenting the message to a plurality of message fragments, each of the message fragments having a length not longer than the limited message length and including at least a portion of the message data and the reference number but not including the group number; and
  computer program code for transmitting the message fragments over the data network.

11. A computer readable medium as recited in claim 10, wherein the reference number is one of a plurality of reference numbers, each of the reference numerals is shared by a group of the receiving devices so that the size of the reference number is reduced.

12. A computer readable medium as recited in claim 10, wherein the message fragments of the message are transmitted over a wireless communication protocol in the data network.

13. A computer readable medium as recited in claim 12, wherein said computer program code for fragmenting the message to a plurality of message fragments comprises:
  computer program code for obtaining a message size for the message; and
  computer program code for determining whether the message size is greater than the limited message length, and
  wherein when the message size is not greater than the limited message length, avoiding performance of said computer program code for fragmenting, and then transmitting the message without fragmentation.

14. A computer readable medium as recited in claim 10, wherein said computer program code for determining of the group number comprises:
  computer program code for obtaining an address from the message; and
  computer program code for determining the group number based on the address from the message.

15. A computer readable medium as recited in claim 10, wherein said computer program code for determining of the group number comprises:
  computer program code for obtaining an address from the message; and
  computer program code for performing a hash function on the address from the message to determine the group number for the message.

16. A computer readable medium as recited in claim 15, wherein the hash function operates substantially randomly with respect to determining the group number from the address from the message.

17. A computer readable medium as recited in claim 15, wherein said computer program code for obtaining the reference number for the message comprises:

computer program code for indexing into a reference number table using the group number to select one of a plurality of reference numbers within the reference number table, each of the reference numbers being associated with a different group.

18. A computer readable medium as recited in claim 10, wherein said computer program code for obtaining the reference number for the message comprises:

computer program code for indexing into a reference number table using the group number to select one of a plurality of reference numbers within the reference number table, each of the reference numbers being associated with a different group.

19. A computer readable medium as recited in claim 18, wherein said computer program code for determining of the group number comprises:

computer program code for obtaining the address from the message; and computer program code for determining the group number based on the address from the message.

20. A computer readable medium as recited in claim 19, wherein the message is transmitted over a wireless communication protocol in the data network.

21. An apparatus for transmitting messages through a data network to mobile devices, said apparatus comprising:

a message buffer for storing a message to be transmitted to a particular mobile device over the data network a group determination unit operatively connected to said message buffer, said group determination unit determines a group number for the message, the group number identifying a group associated with the particular mobile device;

a reference number table operatively connected to said group determination unit said reference number table associating a different one of a plurality of reference numbers with each of the groups;

a fragmentation unit operatively connected to said reference number table and said message buffer, wherein said fragmentation unit receives a particular reference number from said reference number table based on the group number for the message and receives the message from the message buffer, and said fragmentation unit operates to fragment the message into sub-messages, with each of the sub-messages including the particular reference number and a portion of the message; and a message transmission unit, said message transmission unit transmits the sub-messages to the particular mobile device.

22. An apparatus as recited in claim 21, wherein the sub-messages are sequentially transmitted over the data network.

* * * * *